United States Patent [19]

Trueblood et al.

[11] Patent Number: 5,691,032

[45] Date of Patent: Nov. 25, 1997

[54] METHOD OF MAKING A BIRD REPELLANT STRUCTURE AND BLANK FOR USE THEREIN

[75] Inventors: Terry L. Trueblood, Onalaska; Timmy J. Trueblood, La Crosse, both of Wis.

[73] Assignee: Jack B. Shaw, Johnstown, Pa.

[21] Appl. No.: 601,589

[22] Filed: Feb. 14, 1996

[51] Int. Cl.⁶ ........................................................ E04B 1/72
[52] U.S. Cl. .................... 428/136; 428/577; 428/596; 428/597; 428/131; 428/132; 428/119; 83/40; 83/49; 83/41; 52/101; 72/335
[58] Field of Search ............................ 428/577, 596, 428/597, 131, 132, 119, 136; 83/40, 49, 41; 52/101; 72/335

[56] References Cited

U.S. PATENT DOCUMENTS 3,407,550  10/1968  Shaw ........................................ 52/101
4,997,721  3/1991  Shaw et al. ............................. 428/577

*Primary Examiner*—William Watkins
*Attorney, Agent, or Firm*—Banner & Witcoff, Ltd.

[57] ABSTRACT

A method of making a bird repellant structure includes the steps of punching into a continuous base strip a plurality of diagonal slots, cutting into the continuous base strip at least one finger extending from each of the diagonal slots such that a leading end of each finger is formed by a portion of the diagonal edge of each respective slot, and thereafter, punching a plurality of repellant arms into the continuous base strip. The repellant arms extend longitudinally from each diagonal slot such that a leading end of each repellant arm is formed by the diagonal edge of each diagonal slot and includes the fingers cut therein.

17 Claims, 3 Drawing Sheets

5,691,032

METHOD OF MAKING A BIRD REPELLANT STRUCTURE AND BLANK FOR USE THEREIN

TECHNICAL FIELD

The present invention relates to a method of making a bird repellant structure, and in particular, to a method, capable of full automation, for forming a bird repellant with repellant arms and sharp fingers which will prevent birds from roosting or resting on building windows, roof ledges, and the like.

BACKGROUND OF THE INVENTION

The problem of bird proofing buildings has produced through the years a myriad of diverse proposals. These have included electrical systems to emit electrical shocks, auditory systems to simulate distress calls or natural bird enemy calls, and mechanical systems having multi-part components requiring extensive installation procedures and costs. In addition, prior mechanical structures usually included sharp protrusions that looked sufficiently menacing as to frighten people into believing that actual harm may come to the birds.

Accordingly, a simpler and less menacing structure was developed for easy installation on roofs and windows, as shown in U.S. Pat. No. 3,407,550 to Shaw et al., the entire contents of which are hereby incorporated by reference. This structure, marketed under the tradename Cat Claw®, includes a continuous metal blank strip from which diagonal slots and longitudinal strips are punched to form repellant arms. Thereafter, short cuts are longitudinally made on the end of each arm to make sharp fingers which, when spread apart, form sharp barbs that repel the birds. Thus, a relatively unobtrusive mechanical structure is constructed which may be readily installed by the consumer.

The process of making the above repellant structure is described in detail in U.S. Pat. No. 4,997,721 to Shaw et at., the entire contents of which are hereby incorporated by reference. This prior method of manufacturing the Cat Claw® requires the cutting of the sharp fingers to be done manually, after the diagonal slots and longitudinal strips are punched into the metal blank. Thus, the overall manufacturing process is impeded and production numbers are limited by this manual step. Many attempts have been made to automate this manual step, however, the attempts hereto fore have been without success.

SUMMARY OF THE PRESENT INVENTION

The present invention overcomes the disadvantages of the prior art by providing a method of manufacturing a bird repellant that is capable of being fully automated. Thus, the overall manufacturing process is not impeded and the production of the repellant structure is limited only by machinery capabilities, not the speed of manual cutting steps within the process.

The method of manufacturing a bird repellant structure according to a preferred embodiment of the present invention includes punching into a continuous base strip a plurality of first diagonal slots of substantially the same dimension, with the first diagonal slots being disposed substantially equidistant from the center longitudinal axis of the base strip. A second diagonal slot of substantially the same dimension as the first diagonal slots is also punched into the continuous base strip, with the second diagonal slot being substantially on the center longitudinal axis of the base strip and parallel to one of the first diagonal slots. A plurality of third diagonal slots are also punched into the continuous base strip, with the third diagonal slots preferably being lesser in dimension than the first and second slots, and each third diagonal slot being parallel to one of the first diagonal slots.

Thereafter, a first finger extending from each of the diagonal slots is cut into the base strip such that a leading end of each first finger is formed by a portion of the diagonal edge of each respective slot. A second finger extending from each of the diagonal slots is also cut into the base strip such that a leading end of the second finger is formed by a portion of the diagonal edge of each respective slot. The fingers cut from the diagonal slots have sharp pointed ends which form the barbs on the bird repellant structure.

Lastly, a plurality of first lift bars or repellant arms are punched into the continuous base strip, the first lift bars extending longitudinally from each first diagonal slots such that a leading end of each first lift bar is formed by the diagonal edge of each first diagonal slot and includes the first and second fingers thereof. A second lift bar or repellant arm is similarly punched into the continuous base strip, the second lift bar extending longitudinally from the second diagonal slot such that a leading end of the second lift bar is formed by the diagonal edge of the second diagonal slot and includes the first and second fingers thereof. Further, a plurality of third lift bars or repellant arms are punched into the continuous base strip, the third lift bars extending longitudinally from each third diagonal slot such that a leading end of each third lift bar is formed by the diagonal edge of each third diagonal slot and includes the first and second fingers thereof. The lift bars are attached to the base strip at only one end so that they may be flexed or bent upwards to form the necessary projecting repellant arms having the sharp barbs on the ends thereof.

BRIEF DESCRIPTION OF THE DRAWINGS

The above description and other objects, advantages and features of the present invention will be more fully understood and appreciated by reference to the specification and accompanying drawings, wherein.

DETAILED DESCRIPTION OF THE PREFERRED EMBODIMENTS

Figure 1:
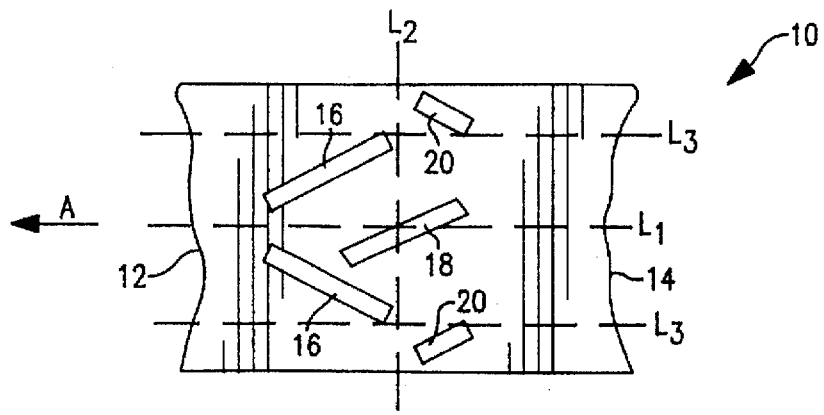
FIG. 1 is a fragmentary top plan view of a continuous metal blank at a first stage of the manufacturing process of the present invention.

Referring to FIG. 1, a continuous base strip from which the bird repellant is constructed is shown generally by reference numeral 10. Base strip 10 is preferably a metal, such as steel or stainless steel, having a width of approximately 1.5 inches. In a preferred embodiment, base strip 10 is 18 gauge 18-8 stainless steel. The base strip 10 is fed through the manufacturing machinery in a direction indicated by the arrow A such that a leading end 12 and a terminal end 14 of base strip 10 are defined.

The manufacturing method of the present invention includes first punching a plurality of diagonal slots into base strip 10. More particularly, a pair of apposing first diagonal slots 16 are punched or stamped into base strip 10 substantially equidistant from the center longitudinal axis $L_1$ and a second diagonal slot 18 is also punched substantially along the center longitudinal axis $L_1$. The diagonal slots 16, 18 are preferably all of substantially the same dimension. In a preferred embodiment, slots 16, 18 are approximately 1.7 cm in length and 0.3 cm in width. Additionally, slots 16 are disposed at an angle of approximately twenty degrees from the center longitudinal axis $L_1$ of base strip 10. The third diagonal slot 18 is disposed between slots 16 such that the leading end of slot 18 crosses the transverse line $L_2$ between the terminal ends of the slots 16.

Base strip 10 further includes a pair of third diagonal slots 20 punched approximately equidistant on each side of second diagonal slot 18. Slots 20 are preferably disposed such that the terminal ends thereof are transversely aligned with a terminal end of slot 18. The leading ends of slots 20 are disposed at an angle of approximately twenty degrees from a longitudinal axis $L_3$ extending through the terminal ends of each slot 16 and the correspondingly located slot 20. Third slots 20 are preferably smaller than first and second slot 16 and 18, being approximately 0.9 cm in length and 0.3 cm in width.

Figure 2:
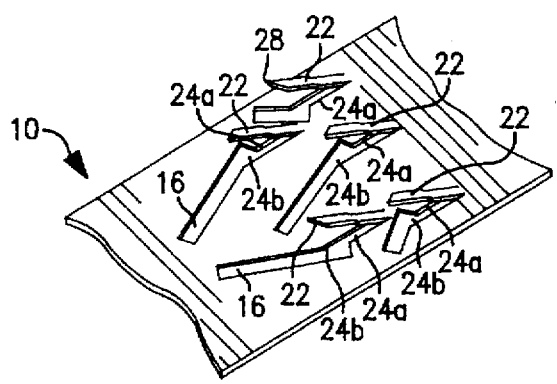
FIG. 2 is a perspective view thereof at a further stage of the manufacturing process.

Referring also to FIG. 2, the second stage of manufacturing the present invention is illustrated. After the plurality of diagonal slots have been punched into the base strip 10, a plurality of first fingers are cut in the base strip, with a portion of each diagonal slot serving as a leading end therefor. More particularly, a short longitudinal cut 24a is made from the trailing, terminal corner of each slot 16. Spaced in front thereof or toward the leading end, a further short longitudinal cut 24b is made in base strip 10. The cuts 24a and 24b extend to substantially the same terminal or base line and thereby define first fingers 22 extending from first slots 16, each having a sharp and pointed end 28. Similarly, a short longitudinal cut 24a is made from the trailing, terminal corner of second slot 18 and cut 24b is made in front thereof to thereby define a first finger 22 extending from second slot 18. In addition, a short longitudinal cut 24a is made from the trailing terminal corner of third slots 20 and cut 24b is made in front thereof toward the leading end to thereby define a first finger 22 extending from each third slot 20.

Figure 3:
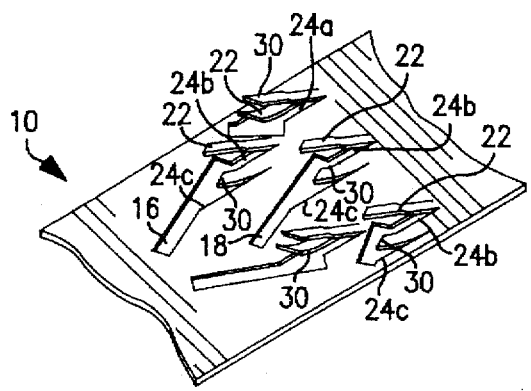
FIG. 3 is perspective view thereof at a further stage of the manufacturing process.

Referring to FIG. 3, the third stage of manufacturing the present invention is illustrated. After the plurality of diagonal slots have been punched into the base strip 10 and the plurality of first fingers 22 are cut in the base strip, a plurality of second fingers 30 are cut in the base strip, with a portion of each diagonal slot again serving as a leading end therefor. More particularly, a short longitudinal cut 24c is made in base strip 10 above or spaced toward the leading end from short longitudinal cut 24b of slots 16. The cuts 24c extends substantially the same distance and are approximately the same length as cuts 24a and 24b. Since cuts 24c are spaced in front thereof (toward the leading end), however, cuts 24c and cuts 24b define second fingers 30, staggered in front of first fingers 22, extending from first slots 16, and each having a sharp and pointed end 28. Similarly, a short longitudinal cut 24c made in front of cut 24b of slot 18 defines a second finger 30 extending from second slot 18. In addition, short longitudinal cut 24c made in front of cuts 24b of slots 20 define second fingers 30 extending from each third slot 20.

Figure 4:
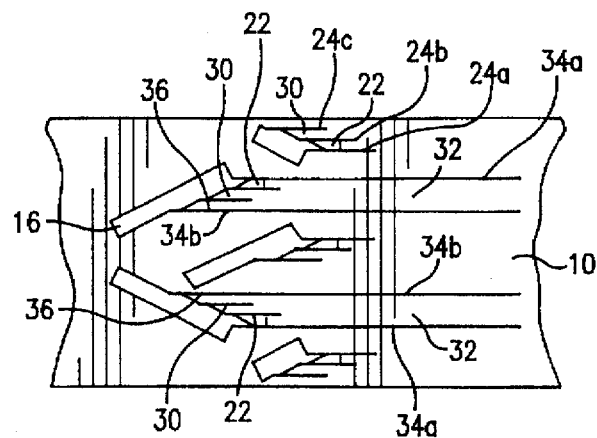
FIG. 4 is a top plan view thereof at a further stage of the manufacturing process.
Figure 5:
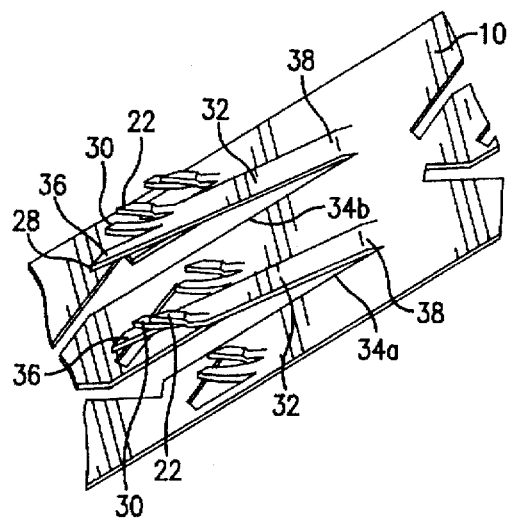
FIG. 5 is a side elevational view of the structure shown in FIG. 4.

Referring also to FIGS. 4 and 5, the fourth stage of manufacturing the bird repellant of the present invention is illustrated. After first and second fingers 22, 30 are formed by short longitudinal cuts 24a, 24b, 24c, first lift bars 32 and third fingers 36 are formed extending from first slots 16. Lift bars 32 are formed by making long longitudinal cuts 34a that, in essence, increase the length of cuts 24a extending from the trailing terminal ends of slots 16. Spaced in front of cuts 24c on slots 16, a further long longitudinal cut 34b is made. Long longitudinal cuts 34a, 34b extend to substantially the same terminal or base line and thereby define first lift bars 32 extending from first slots 16. The terminal ends of lift bars 32 remain attached to base strip 10 and may be raised slightly therefrom by a bend 38 formed in base strip 10. In addition, third fingers 36 are defined between short cut 24c and long cut 34b such that each has a sharp and pointed end 28 and the leading end is defined by a portion of the diagonal edge of slot 16. Thus, lift bars 32 extending from slots 16 include a long longitudinal arm having first, second and third fingers 22, 30, 36 extending from a free end thereof.

Figure 6:
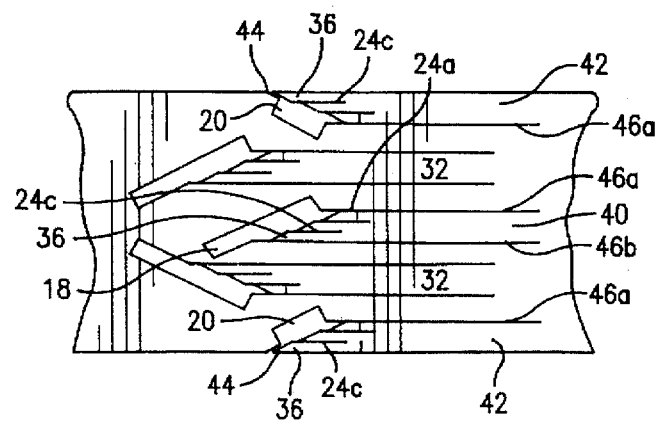
FIG. 6 is a top plan view thereof at a further stage of the manufacturing process.
Figures 7, 8:
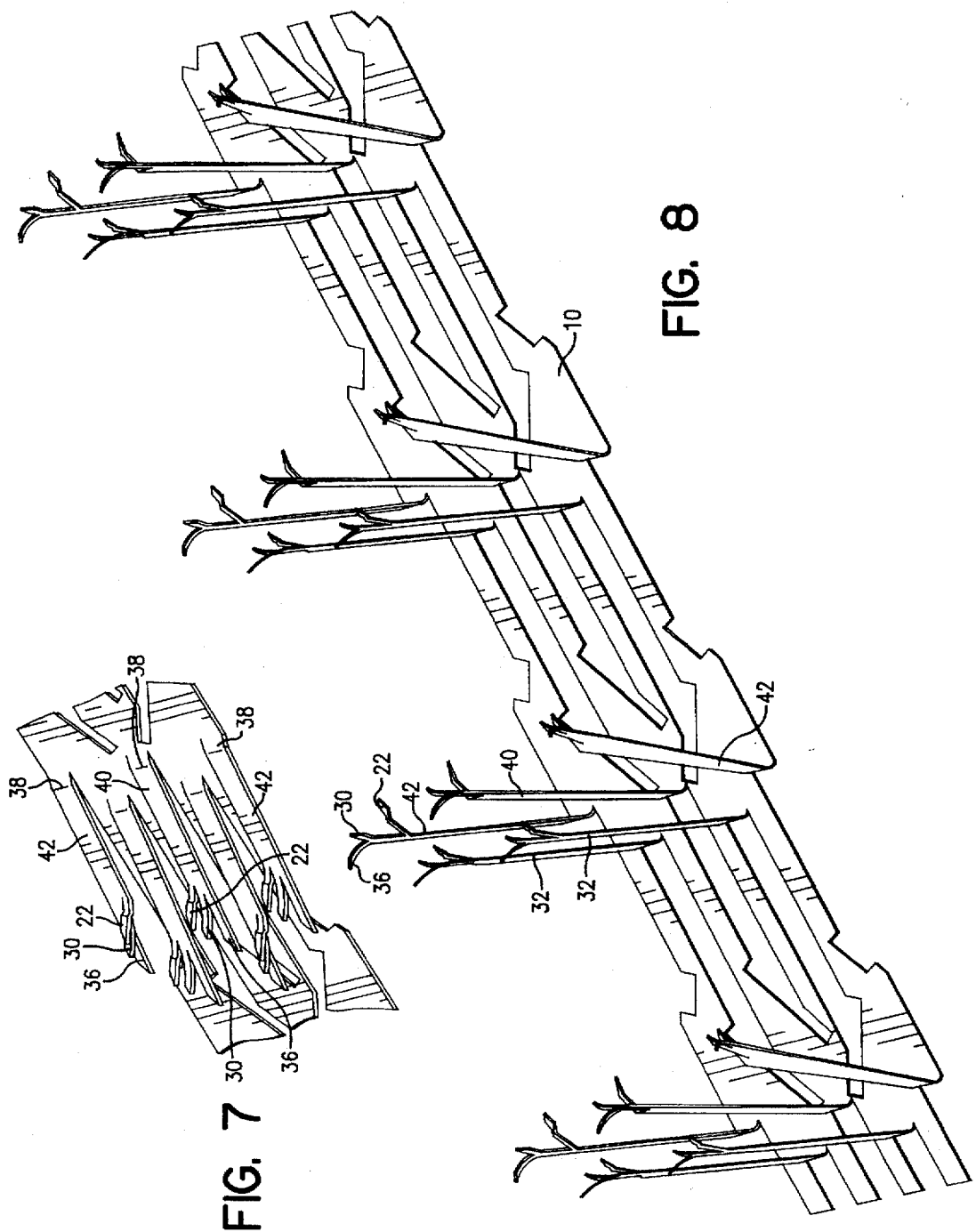
FIG. 7 is a perspective view thereof at a final stage of the manufacturing process.
FIG. 8 is a perspective view thereof prior to installation.

Referring next to FIGS. 6 and 7, the fifth stage of manufacturing the bird repellant of the present invention is illustrated. Second lift bars 40 and third lift bars 42 are formed extending from second slot 18 and third slots 20, respectively, and third fingers 36 are formed. Second lift bars 40 are formed by making a long longitudinal cuts 46a that, in essence, increase the length of cut 24a extending from the trailing terminal end of slot 18. Spaced in front of cut 24c on slot 18, a further long longitudinal cut 46b is made. Long longitudinal cuts 46a, 46b extend to substantially the same terminal or base line, spaced rearward or toward the terminal end from cuts 34a, 34b, and thereby define second lift bar 40 extending from second slot 18 and staggered rearward of first lift bar 32. The terminal ends of lift bar 40 remain attached to base strip 10 and may be raised slightly therefrom by a bend 38 formed in base strip 10. In addition, a third finger 36 is defined between short cut 24c and long cut 46b such that it has a sharp and pointed end 28 and the leading end is defined by a portion of the diagonal edge of slot 18. Thus, second lift bar 40 extending from slot 18 include a long longitudinal arm having first, second and third fingers 22, 30, 36 extending from a free end thereof.

In addition, third lift bars 42 are formed by making long longitudinal cuts 46a that, in essence, increase the length of cuts 24a extending from the trailing terminal ends of slots 20. Spaced in front of cut 24c on each slot 20, a further short diagonal cut 44 is made extending the diagonal edge of slot 20 to the edge of base strip 10. In so doing, third fingers 36 are defined between short longitudinal cuts 24c and the outer edges of base strip 10, with a leading end thereof being formed by the diagonal edge cut free by diagonal cut 44. Long longitudinal cuts 46a extend to substantially the same terminal or base line as cuts 46a, 46b defining second lift bar 40, and are therefore also staggered rearward of first lift bar 32. The terminal ends of third lift bars 42 remain attached to base strip 10 and may be raised slightly therefrom by a bend 38 formed in base strip 10. Thus, third lift bars 42 extending from slots 20 include a long longitudinal arm having first, second and third fingers 22, 30, 36 extending from a free end thereof.

Preferably, the first, second and third lift bars 32, 40, 42 are substantially parallel to one another and are of substantially the same dimensions. In a preferred embodiment, the lift bars are approximately 6.25–7.5 cm in length, depending upon from which finger the length is measured and approximately 0.4 cm in width.

The method of manufacturing the present invention may be accomplished by conventional metal cutting techniques in a fully automated process. Thus, the manual cutting and bending of the barbs or fingers no longer impedes production of the bird repellant. Preferably, the base strip 10 is passed through a first set of cutter rollers that punch or stamp out the slots, a second set of cutter rollers then cut first and second fingers, and a third set of cutter rollers then punch or stamp first and second lift bars and simultaneously form the third fingers. Alternatively, the base strip 10 with the slots already punched therein may be rolled into a coil for storage as blank base. The blank base may then be shipped to other locations or used as the starting material to complete the manufacture of the bird repellant structure. Prior to installation, the lift bars 32, 40, 42 may be physically bent away from base strip 10 by flexing the base strip or the lift bars in alternating motions. Referring to FIG. 8, once bent away from base strip 10, the lift bars become repellant arms having a plurality of sharp pointed barbs extending therefrom. If desired, the fingers may also be further bent and separated. Thus, when placed on a roof, ledge, window sill, or the like, the repellant arms effectively persuade most avian species to avoid roosting thereon.

While the invention has been described with reference to specific embodiments, it will be apparent to those skilled in the art that many alternatives, modifications and variations may be made. Accordingly, it is intended to embrace all such alternatives, modifications and variations that may fall within the spirit and scope of the appended claims.

We claim:

1. A method of making a bird repellant structure comprising:
    punching into a continuous base strip a plurality of diagonal slots;
    cutting into the continuous base strip at least one finger extending from each of the diagonal slots such that a leading end of each finger is formed by a portion of the diagonal edge of each respective slot; and
    thereafter, punching a plurality of repellant arms into the continuous base strip, the repellant arms extending longitudinally from each diagonal slot such that a leading end of each repellant arm is formed by the diagonal edge of one of the diagonal slots and includes the fingers thereof.

2. The method of claim 1 wherein said punching step includes punching two first diagonal slots into the continuous base strip, the first slots being disposed substantially equidistant from a center longitudinal axis of the continuous base strip and having substantially the same dimension.

3. The method of claim 2 wherein said punching step further includes punching a second diagonal slot of substantially the same dimension as the first diagonal slots and substantially on the center longitudinal axis of the base strip.

4. The method of claim 3 wherein said punching step further includes punching two third diagonal slots into the base strip, each third diagonal slot being parallel to one of the first diagonal slots.

5. The method of claim 4 wherein cutting at least one finger defines a first finger, and said cutting step further includes cutting a second finger extending from each of the diagonal slots such that a leading end of each second finger is formed by a portion of the diagonal edge of each respective slot.

6. The method of claim 5 wherein said punching step includes punching first repellant arms extending longitudinally from the first diagonal slots such that a leading end of each first repellant arm is formed by the diagonal edge of the first diagonal slots and includes the first and second fingers thereof.

7. The method of claim 6 wherein said punching step further includes punching second repellant arms extending longitudinally from the second diagonal slot such that a leading end of the second repellant arm is formed by the diagonal edge of the second diagonal slot and includes the first and second fingers thereof.

8. The method of claim 7 wherein said punching step further includes punching third repellant arms extending longitudinally from the third diagonal slots such that a leading end of each third repellant arm is formed by the diagonal edge of the third diagonal slots and includes the first and second fingers thereof.

9. The method of claim 1 wherein said punching the repellant arms step further includes simultaneously forming a third finger extending from each of the diagonal slots such that a leading end of the third finger is formed by a portion of the diagonal edge of each respective slot, and the leading end of each repellant arm is formed by the diagonal edge of the slot and thereby further includes the third finger thereof.

10. A method of manufacturing a bird repellant structure, said method comprising:
    punching into a continuous base strip a plurality of first diagonal slots of substantially the same dimension, said slots being disposed substantially equidistant from the center longitudinal axis of the base strip;
    punching into the continuous base strip a second diagonal slot of substantially the same dimension as the first diagonal slots, the second diagonal slot being substantially on the center longitudinal axis of the base strip and parallel to one of the first diagonal slots;
    punching into the continuous base strip a plurality of third diagonal slots, the third diagonal slots being lesser in dimension than the first and second slots, and each third diagonal slot being parallel to one of the first diagonal slots;
    cutting into the continuous base strip a first finger extending from each of the diagonal slots such that a leading end of each first finger is formed by a portion of the diagonal edge of each respective slot;
    cutting into the continuous base strip a second finger extending from each of the diagonal slots such that a leading end of the second finger is formed by a portion of the diagonal edge of each respective slot;
    punching a plurality of first lift bars into the continuous base strip, the first lift bars extending longitudinally from each first diagonal slots such that a leading end of each first lift bar is formed by the diagonal edge of each first diagonal slot and includes the first and second fingers thereof;
    punching a second lift bar into the continuous base strip, the second lift bar extending longitudinally from the second diagonal slot such that a leading end of the second lift bar is formed by the diagonal edge of the second diagonal slot and includes the first and second fingers thereof; and
    punching a plurality of third lift bars in the continuous base strip, the third lift bars extending longitudinally from each third diagonal slot such that a leading end of each third lift bar is formed by the diagonal edge of each third diagonal slot and includes the first and second fingers thereof.

11. The method of claim 10 wherein said steps of punching the first and second lift bars further includes forming a third finger extending from each of the first and second diagonal slots such that a leading end of the third finger is formed by a portion of the diagonal edge of each respective slot, and the leading end of each first and second lift bar being formed by the diagonal edge of the slot and thereby further including the third finger thereof.

12. The method of claim 10 wherein said step of punching the second diagonal slot further includes punching the second diagonal slot between the first slots such that a lead end of the second slog rests approximately on a lateral line between terminal ends of the first diagonal slots.

13. The method of claim 10 wherein said steps of punching the lift bars further include terminating the lift bars at a point where the lift bars are integrally attached to the continuous base strip.

14. The method of claim 10 wherein said step of punching the second lift bar includes punching the second lift bar to be located substantially on the center longitudinal axis of the continuous base strip.

15. The method of claim 10 wherein said step of punching the third lift bars include punching the third lift bars to begin and terminate on approximately the same lateral line as the second lift bar, and the outer edges of the third lift bars being formed by the outer longitudinal edges of the continuous base strip.

16. The method of claim 15 further including cutting a diagonal cut extending from each third diagonal slot to the outer longitudinal edge of the continuous base strip to form a third finger extending from each third diagonal slot, the diagonal cut being parallel to each respective third diagonal slot such that a leading end of each third lift bar is formed by the diagonal edge of the slot and thereby includes the first, second, and third fingers thereof.

17. A blank base for the manufacture of a bird repellant structure, said blank base comprising:

a continuous base strip with a plurality of cut-out diagonal slots disposed therein;

said plurality of diagonal slots including first slots, a second slot and third slots;

said first slots including two apposing diagonal slots of substantially the same dimension disposed substantially equidistant from a center longitudinal axis of said base strip;

said second slot being substantially the same dimension as said apposing first diagonal slots and substantially on the center longitudinal axis of said base strip, said slot being parallel to one or the other of said first diagonal slots and being disposed between said first slots such that a leading of the second slot rests approximately on a lateral line extending between the terminal ends of the first diagonal slots;

said third slots being lesser in dimension than the first and second slots and disposed approximately equidistant from said second slot, said third diagonal slots being parallel to one of the first diagonal slots and disposed such that the terminal end of the third slots rest approximately on a lateral line extending along the terminal end of the second slot.

* * * * *